April 21, 1970　　　　E. L. McDONALD　　　　3,507,002
APPARATUS FOR QUIETING POULTRY INCIDENT TO
PREPARATION FOR MARKETING
Filed March 4, 1968　　　　　　　　　　　　2 Sheets-Sheet 1
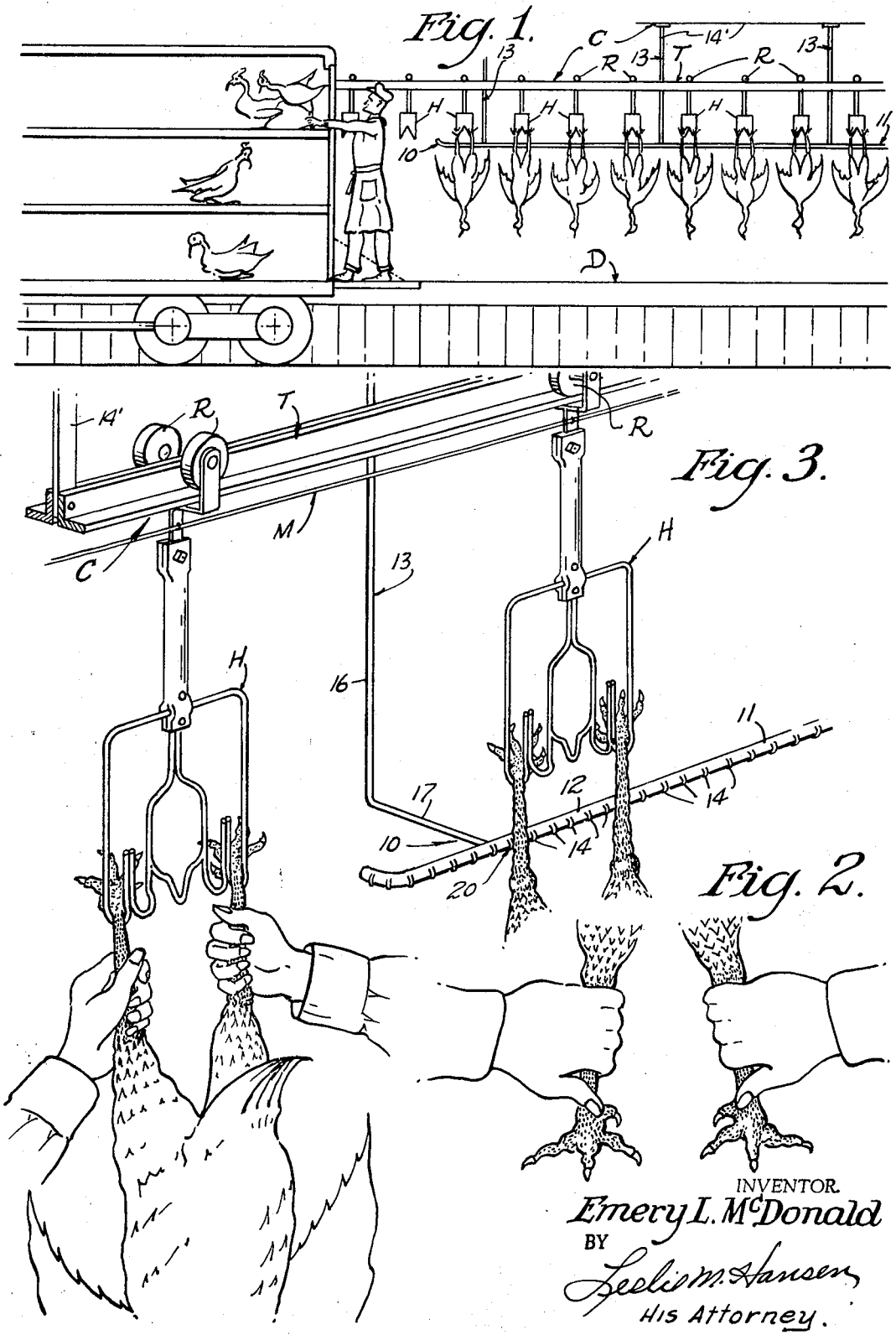
INVENTOR.
Emery L. McDonald
BY
Leelie M. Hansen
His Attorney.

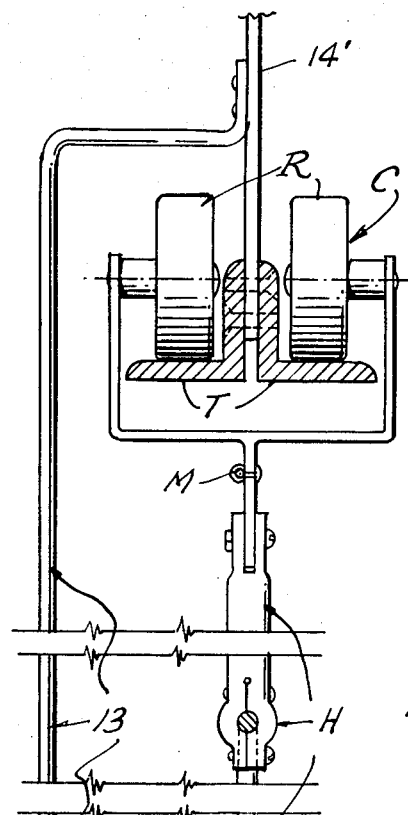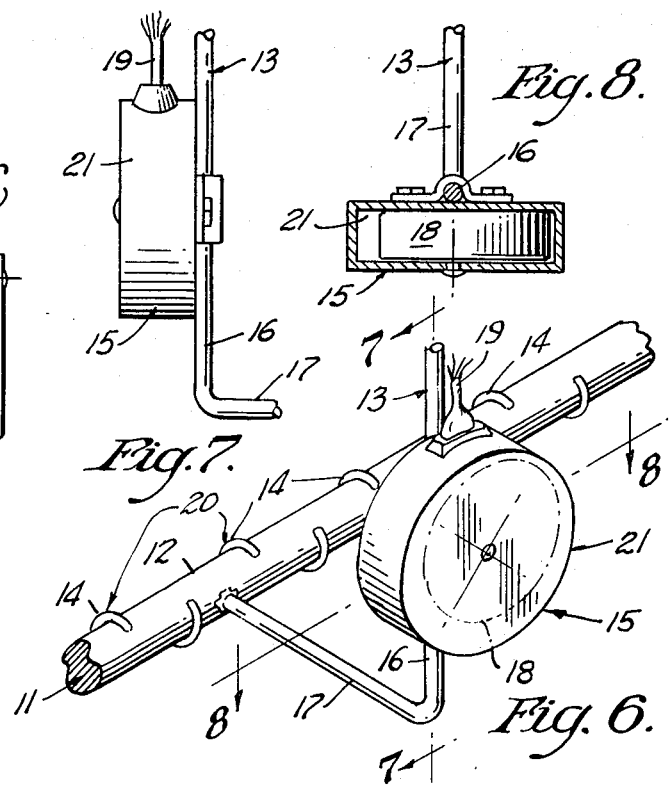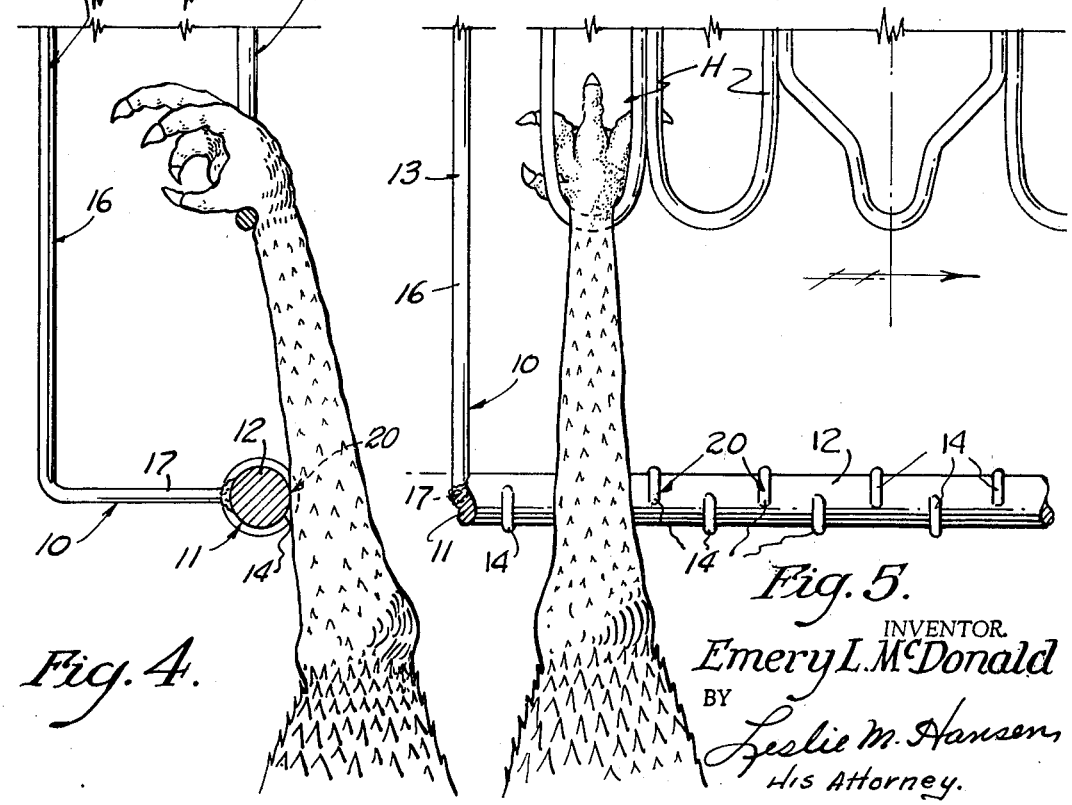

United States Patent Office 3,507,002
Patented Apr. 21, 1970

3,507,002
APPARATUS FOR QUIETING POULTRY INCIDENT
TO PREPARATION FOR MARKETING
Emery L. McDonald, 10395 Wunderlich Drive,
Cupertino, Calif. 95014
Filed Mar. 4, 1968, Ser. No. 710,066
Int. Cl. A22c 21/00
U.S. Cl. 17—11                                    10 Claims

ABSTRACT OF THE DISCLOSURE

Apparatus for pacifying birds into a state of calm during conveyance toward a slaghtering station. Apparatus operatively associated with a conveyor for touching the legs of birds carried thereby for quieting the birds into a state of non-resistance. A device for engaging the legs of the birds suspended thereby from hangers on a conveyor for lulling the birds into a state of tranquillity to thereby minimize undue wing flapping and resulting injury and bruising of the birds.

BACKGROUND

As is well known turkeys are a domesticated breed developed from indigenous wild stock. By reason of inbreeding over many generations, turkeys are notoriously demented and inclined to go crazy at the sound of the slightest strange noise or change of light. The bark of a dog; the honk of a horn or the sudden movement of an object nearby, such as a scrap of paper or leaf in the wind can cause them to stampede. Consequently, loading from the growing yards into trucks is done in the dark of night and under stealthy quiet conditions to create the least amount of commotion within the flock.

The birds are shipped to slaughterhouses by truck and there taken from their cages by hand. The workmen twist their wrists then grasp the legs of the birds such that they are automatically turned upside down by a twist of the wrists. The feet of the birds are then uppermost and inserted into V shaped rungs of a harp-like hanger suspended from a conveyor track. Turkeys instinctively resist this handling by flapping their wings and fighting in an effort to free themselves. Such flapping of the wings and struggling of the birds creates several hazards both to the health and well being of the men handling the birds as well as to the ultimate condition of the meat of the birds.

A dust hazard is created by reason of the birds having dusted themselves in the growing pens. When they flap their wings during inversion and hanging, clouds of dust come off the feathers. This obstructs visibility and is harmful to the men on the dock. The dust gets into the men's eyes and nostrils and can cause serious lung conditions. Consequently, exhaust fans are required to clear the air and draw off the dust and dirt at the receiving dock.

Bodily harm to the men and birds is another hazard. In the case of turkey birds weighing from ten pounds on up to 40 pounds the wing spread and strength of the birds is so great as to cause bodily bruising and injury to the men handling them. More particularly, however, the flailing and beating of the wings of one bird against adjacent birds causes bruises on the bodies of the birds. After defeathering and dressing of the birds these bruises show up as unsightly darkened areas on breasts, legs and other parts of the bodies where hemorrhaging has occurred.

Birds thus injured are rejected and rendered less expensive than whole birds. Only the unbruised meat of the birds can be sold at the highest market price. Consequently any bruised portions of such injured bird must be cut out as unsuited for human consumption. Unbruised portions of such inpured birds may be sold as turkey parts for turkey pies and/or soups and the like. This results in a loss of profit.

Statistics show such losses to occur in from ten to twenty percent of the number of birds handled. The overall percentage has been calculated to run from .04 cent to .05 cent a bird on the entire plant operation. An average plant handling from 10,000 to 15,000 birds a day can experience a loss of between $400.00 to $500.00 in one day. This leaves much to be desired in measures for preventing injuries to the birds.

Leading up to the present invention the main problem is to prevent the birds from resisting and struggling unnecessarily during handling prior to their demise.

In accordance with the present invention it has been discovered that birds, turkeys in particular, become temporarily tranquilized by the touch of a strange or different sensation transmitted into their legs. Such strange sensations result in a momentary quieting of the birds and they remain quite docile while the nuance or effects of such strange and different sensation is transmitted to their legs.

For this reason it is a more specific object of the present invention to provide means for inducing sensations into the legs of the birds during automatic conveyance of the birds to a slaughtering station.

It is another object of this invention to provide means operatively related with the bird conveyor for engaging the legs of the birds for inducing a variable soothing sensation thereto during movement of the birds by the conveyor.

In connection with the foregoing objects it has been discovered that in addition to minimizing the loss of poultry at a higher market value, killing of the birds in a state of calm renders the meat of the birds more flavorful and palatable. It is well known among slaughterhousemen that violent resistance and exertions of animals as well as birds to the kill causes excessive adrenaline release in the metabolism of these creatures. Such excessive glandular function causes a change in taste as well as texture of the meat. The most tender and flavorful meat being derived from birds and animals killed instantly while in a state of calm.

It is therefore a further object of this invention to provide means for pacifying birds during conveyance in a suspended condition prior to slaughtering of the birds.

These and other objects and advantages of the present invention will become apparent in the following description and claims when read in the light of the accompanying drawings in which:

FIG. 1 is a pictoral illustration of a truck being unloaded at the receiving station of a poultry handling conveyor;

FIG. 2 is a fragmentary illustration of the manner of grasping the legs of a bird;

FIG. 3 is a fragmentary perspective view of the receiving end of the conveyor of FIG. 1 illustrating the manner of hanging the birds on the conveyor.

FIG. 4 is an enlarged sectional view of the conveyor of FIGS. 1 and 3;

FIG. 5 is a partial elevational view of the lower portion of FIG. 4 illustrating the embodiment of the poultry quieting apparatus of present invention therein;

FIG. 6 is a fragmentary perspective view of a portion of the quieting apparatus of FIGS. 3, 4 and 5;

FIG. 7 is a vertical section through FIG. 6 as seen from line 7—7 therein; and

FIG. 8 is a horizontal section through FIG. 6 taken along line 8—8 thereof.

Referring to the drawings, FIG. 1 shows a receiving dock D at the slaughterhouse wherein an overhead conveyor C has a plurality of hangers H suspended from rollers R guided on a track T which extends into the processing part of the building (not shown). The birds are shipped by truck to the receiving dock D where the men take the birds from their cages and hang the birds, upside down on the hangers H of the conveyor C. As best illustrated in FIG. 2, the workmen turn their wrists inwardly and grasp the legs of the birds by hand with thumbs down. Then with the legs firmly gripped, the birds are drawn free of the cage and by a twist of the wrists the workmen invert the birds with legs up. The feet of the birds are then inserted into yoke-like tines of the hanger H as illustrated in FIGS. 3, 4 and 5 whereupon the birds hang upside down for conveyance into the processing room of the slaughterhouse.

The foregoing handling is usually done so quickly and dexterously by an experienced man that the birds are momentarily stunned and make little or no effort to resist until after they are hung in a suspended condition from the hangers H. As shown in FIG. 1 the hangers are spaced from one another and united for movement by a common drive such as the cable M, a chain or other moving medium of conventional conveyors. It is at this stage that the birds in struggling and flailing their wings can cause bruising of adjacent birds as they are moved along by the conveyor C.

In acordance with the present invention means 10 is provided for pacifying the birds to minimize their struggle and effort to resist. This means 10 consists of an element 11 engageable by the legs of the birds suspended from the hangers H.

In the present embodiment the element 11 is basically a bar 12 arranged parallel to the track T of the conveyor C in a region below the hangers H so as to be engaged by the shank portions of the legs of the birds suspended therefrom. The bar 12 is supported on brackets 13 which extend laterally away from the birds and then upwardly for connection to the overhead structure 14' by which the track T is suspended from the ceiling of the slaughterhouse as illustrated in FIGS. 1, 3 and 4. The bar 12 is stationary and so disposed vertically below the hangers H that the legs of the birds glide along the bar 12 in a sliding action as the conveyor moves the birds along the track T. This wiping movement across the legs of the birds has been found to induce a soothing sensation such as to render the birds quite docile during their movement by the conveyor. It has also been discovered that this soothing effect may wear off, once the birds become accustomed to the normal wiping sensation. For this reason the element 11 is provided with means 20 for creating a variance or nuance during engagement of the legs of the moving birds.

The means 20 for creating variances to the touch of the birds may take different forms. The most simple form is a plurality of nubs or protuberances 14 along the length of the bar 12. These nubs or protuberances may be an integral part of the bar 12 or applied thereto at various spacings such as to induce new and differing sensations to the legs of the birds as they move along.

Another form of means 20 is a vibration creating unit 15 attached to the bar 12 in a manner to cause the latter to vibrate. The vibrations may be sporadic or consistent as desired and/or found necessary.

The vibration creating unit 15 illustrated in FIGS. 6, 7 and 8 is shown secured to the upright portion 16 of one of the brackets 13 supporting the rod 12. The unit 15 may be mounted on any portion of the bracket 13 desired.

The vibration creating unit 15 consists of a housing 21 for an eccentric 18 or other such means, either mechanically or electrically operated for transmitting vibrations to the element 11. Suitable wiring 19 from the unit 15 is connected in a conventional circuit embodying a control panel by which the vibrator is operated. The operation may be sporadic or continuous as required to create the necessary variance in sensations induced into the legs of the birds during conveyance to the point of kill.

Having thus described apparatus for quieting poultry incident to preparation for marketing, it will be appreciated by those skilled in the art that the structure and elements employed may be varied, altered and/or modified without departing from the spirit or scope of the invention herein.

What I claim as new and desire to protect by Letters Patent is:

1. In combination with a poultry conveyor of the type having a track suspended from an overhead support and a plurality of hangers for receiving the foot portions of the birds for conveyance in an inverted condition:
    (a) an element supported beneath said hangers for engaging the legs of the birds for inducing sensations thereto for quieting the birds as they are moved along by said conveyor.

2. The device in accordance with claim 1 in which said element consists of a continuous bar extending parallel to said track for wiping engagement by the legs of the suspended birds thus conveyed.

3. The device of claim 2 in which said bar includes a plurality of nub-like protuberances affording a variance in the sensations induced thereby into the legs of the birds as they are moved along by said conveyor.

4. The device in accordance with claim 2 including a vibrator connected to said bar for vibrating the same.

5. The device in accordance with claim 4 including means for sporadically operating said vibrator.

6. The device in accordance with claim 2 including brackets spaced along said conveyor each having its upper end secured to the overhead support for said track and its lower end secured to said element for fixedly mounting the latter below and in parallel relation to said hangers for engaging the shank portion of the legs of birds as they are moved along by said conveyor.

7. The device in accordance with claim 6 in which said element has a plurality of nub-like protuberances spaced along its length for periodically inducing a nuance to the sensations transmitted to the legs of the birds as they are moved along by said conveyor.

8. The device in accordance with claim 6 including a vibrator mounted on at least one of said brackets in close proximity to said element for vibrating the latter.

9. The device in accordance with claim 8 including means for controlling the operation of said vibrator for periodically operating the latter for transmitting vibrations to the legs of the birds sporadically as they are moved along by said conveyor.

10. The device in accordance with claim 1 in which said element comprises:
    (a) a bar
    (b) a plurality of brackets each having its upper end suspended from the overhead support for said track and its lower end provided with a lateral portion the end of which is secured to said bar for supporting the bar in parallel relation to said track and beneath said hangers for engaging the shank portion of the legs of birds suspended therefrom, and
    (c) a vibrator mounted on one or more of said brackets in close proximity to said bar for vibrating the bar to thereby transmit vibrations to the legs of the birds engaging the same for quieting the birds suspended from said hangers.

References Cited

UNITED STATES PATENTS 2,335,993  12/1943  Bland et al. _____ 17—11

LUCIE H. LAUDENSLAGER, Primary Examiner